(12) United States Patent
Katz et al.

(10) Patent No.: US 7,264,685 B2
(45) Date of Patent: Sep. 4, 2007

(54) METHOD OF MANUFACTURING A COMPOSITE SHODDY

(75) Inventors: Jean-Jacques Katz, Novi, MI (US); Kenneth R. Parrish, Roseville, MI (US); Theodore J. Peterson, Sheboygan Falls, WI (US); Barry R. Wyerman, Novi, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 203 days.

(21) Appl. No.: 10/749,160

(22) Filed: Dec. 30, 2003

(65) Prior Publication Data

US 2005/0142964 A1 Jun. 30, 2005

(51) Int. Cl.
*B32B 5/26* (2006.01)
*B32B 11/10* (2006.01)

(52) U.S. Cl. .......................... 156/60; 156/320; 442/35; 442/48; 442/58; 442/258; 442/263; 442/282

(58) Field of Classification Search .................. None
See application file for complete search history.

(56) References Cited

U.S. PATENT DOCUMENTS

| | | | | |
|---|---|---|---|---|
| 1,248,909 A * | 12/1917 | Pullar | ................... | 442/32 |
| 1,528,436 A * | 3/1925 | Kirschbraun | ................ | 428/196 |
| 4,522,876 A | 6/1985 | Hiers | ...................... | 428/285 |
| 4,828,910 A * | 5/1989 | Haussling | ................... | 442/391 |
| 4,851,274 A | 7/1989 | D'Elia | ......................... | 428/113 |
| 4,873,045 A * | 10/1989 | Fujita et al. | ................ | 264/259 |
| 5,439,725 A | 8/1995 | Roberts | ....................... | 428/95 |
| 5,846,368 A | 12/1998 | Sakaguchi et al. | .......... | 156/245 |
| 6,022,503 A | 2/2000 | Hudkins et al. | ............ | 264/243 |
| 6,099,771 A | 8/2000 | Hudkins et al. | ............ | 264/102 |
| 6,114,014 A | 9/2000 | Ikeda et al. | ................ | 428/192 |
| 6,295,658 B1 | 10/2001 | Jenkins | ....................... | 4/251.1 |
| 6,296,733 B1 | 10/2001 | Hudkins et al. | ............ | 156/245 |
| 6,595,321 B1 | 7/2003 | Tompson | .................... | 181/290 |
| 6,631,785 B2 | 10/2003 | Khambete et al. | ......... | 181/290 |
| 2001/0000233 A1 | 4/2001 | Bailey et al. | ................. | 428/99 |
| 2002/0187300 A1 | 12/2002 | Nakasuji et al. | .............. | 428/95 |
| 2003/0066708 A1* | 4/2003 | Allison et al. | ............. | 181/290 |
| 2004/0065507 A1* | 4/2004 | Jacobsen | ..................... | 181/290 |
| 2004/0110438 A1* | 6/2004 | Tompson et al. | ............. | 442/43 |

* cited by examiner

*Primary Examiner*—Richard Crispino
*Assistant Examiner*—Barbara J. Musser
(74) *Attorney, Agent, or Firm*—Bliss McGlynn, P.C.

(57) ABSTRACT

The present invention relates to a composite shoddy for use in a vehicle interior. To this end, the composite shoddy of the present invention includes an organic material having a predetermined density defining shoddy bottom layer and a scrim material having a predetermined density defining a scrim top layer. The scrim top layer is adapted to operatively engage a surface material and accommodate movement of a surface material in the shear direction. The composite shoddy further includes a bituminous mastic material having a predetermined density defining a mastic middle layer. The mastic middle layer is disposed between the shoddy bottom layer and the scrim top layer.

6 Claims, 1 Drawing Sheet

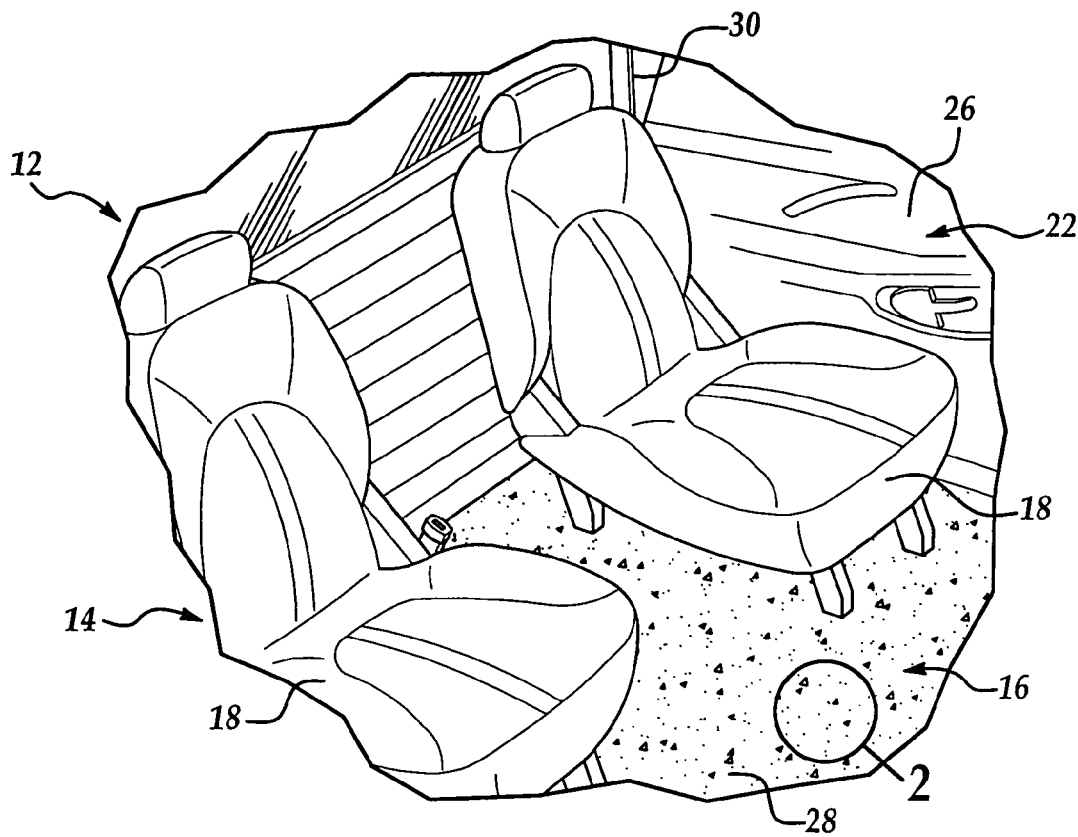
*Figure 1*
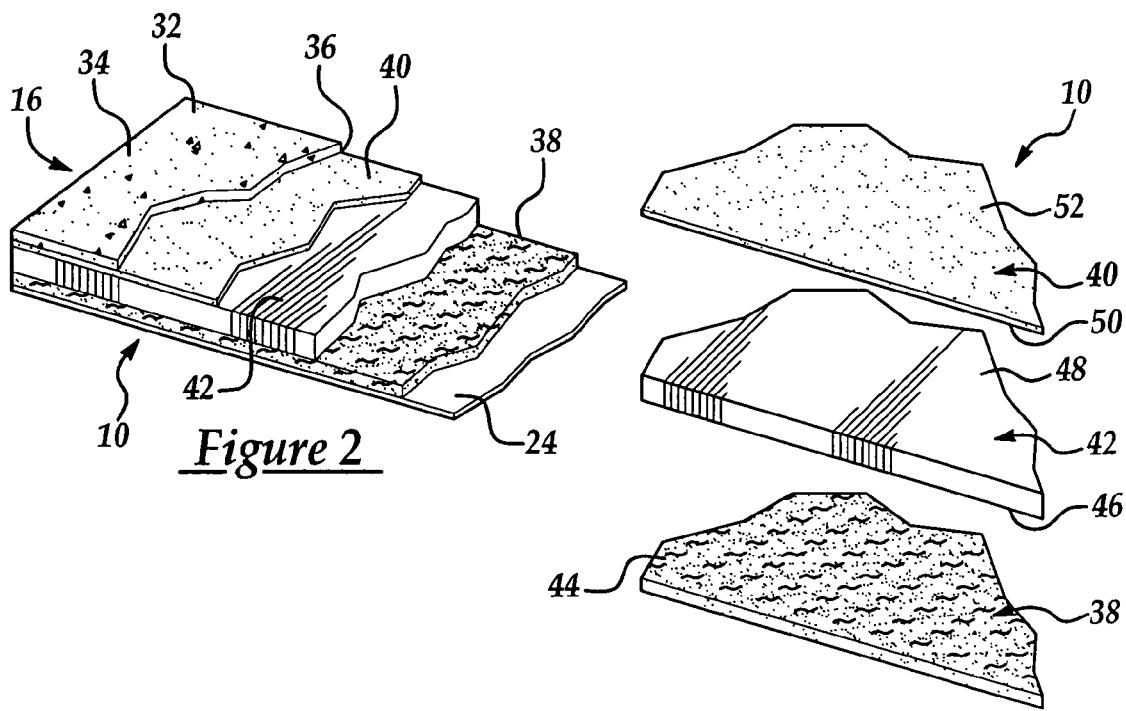
*Figure 2*
*Figure 3*

METHOD OF MANUFACTURING A COMPOSITE SHODDY

BACKGROUND OF THE INVENTION

1. Field of the Invention

The present invention relates, generally, to a composite shoddy for use as a substrate. More specifically, the present invention relates to a composite shoddy for use in automotive applications and method of manufacturing same.

2. Description of the Related Art

Substrates and surface material combinations are employed in a variety of applications within the automotive industry. Substrates are widely used to provide improved aesthetic and functional quality to a surface material. By way of example, substrate and surface material combinations are used as vehicle flooring (carpeted and non-carpeted), headliners, door trim panels, dashboards, trunk area covering, and engine compartment liners among other areas known in the art.

Substrates employed in connection with automotive interiors are adapted to enhance the aesthetic appearance and/or feel of the surface material as well as to improve functional qualities of the surface material by providing sound management, vibration dampening and/or thermal insulation, among other functional qualities. For example, substrates that are commonly employed in connection with components employed in automotive interior applications have what is commonly referred to as an "A-side," which is the side that is visible to the occupant and a "B-side," which is the side of the surface material that faces the substrate. In the automotive field, the term "shoddy" commonly refers to one type of material used as a substrate under a surface material. Traditionally, the material used in forming a shoddy is a compilation of cloth or fibrous remnant material that is resinated, needled, or otherwise bonded together to form a flexible sheet of material. A traditional shoddy flooring substrate may possess some sound/vibration dampening, thermal insulation quality and a cushion-like feel to the flooring material. Accordingly, where a substrate possessing improved sound/vibration dampening or thermal insulation qualities is desired, application of a traditional shoddy substrate may mandate a certain thickness to achieve the desired operational qualities. Unfortunately, in the face of these requisites, the thickness of the shoddy can exceed the standards for acceptable substrate thickness, rendering a traditional shoddy substrate commercially nonviable.

One method of achieving a desired sound/vibration dampening or thermal insulation qualities while maintaining a commercially viable substrate is to combine a layer of traditional shoddy material with a layer of material capable of providing the desired qualities within a predetermined range of thickness. In these applications, the traditional shoddy may be combined with a material commonly referred to as, "mastic," to create a composite shoddy having improved sound blocking and vibration dampening and improved thermal insulation over a traditional shoddy. As a component in a composite shoddy, mastic is constructed from a dense bituminous material, and fabricated into a weighty, yet malleable sheeting to inhibit sound/vibration. The vibration dampening efficacy of the mastic in a composite shoddy depends on its proximity to the surface material. Simply put, the closer the mastic layer is to the surface material, the greater its vibration efficacy.

A composite shoddy may be manufactured using heat and therefore are relatively warm once it has been finally formed. Following manufacture, an inventory of composite shoddy is often stored in a stacked manner to await a particular application. However, once stacked, a composite shoddy may adhere to an adjacent composite shoddy as a result of diffusion caused by the heat of manufacture, ambient temperature, and weight from the above-stacked composites, among other factors. To combat this problem, a release liner may be employed between adjacent each composite shoddy to prevent them from adhering to each other when stacked. The release liner is removed prior to employing the composite shoddy in a particular application. While release liners prevent undesired adhesion between two composites, they impose additional manufacturing steps to apply and later remove the release liner, as well as additional cost associated with materials and manufacturing the release liner itself.

Another known method to avoid the adhesion problem associated with stacking a plurality of recently manufactured composite shoddy is to immediately deploy the composite shoddy in its desired application following manufacture, thereby eliminating stacking altogether. However, this method is often limited to applications where the composite shoddy is secured to the B-side of a non-molded surface material, such as carpeting. These limited applications may require additional assembly where an adhesive is applied to either the B-side of the surface material or to the revealed mastic surface of the composite shoddy or both, to secure the composite shoddy to the B-side of the surface material. In applications where the composite shoddy is secured to a non-carpeted surface material, post-processing material shrinkage becomes an issue.

Post-processing material shrinkage refers to the reduction in size of a non-carpeted surface material as it cures or cools. The stage at which the non-carpeted surface material is formed but not yet cured is commonly referred to as, "tacky" or "green." During the tacky stage, the non-carpeted surface is capable of bonding to the composite shoddy, thereby eliminating the additional assembly step of applying an adhesive, as described above. However, where a composite shoddy is secured to the B-side of a "tacky" non-carpeted surface material, the A-side of the non-carpeted surface material may wrinkle as a result of post-processing material shrinkage, rendering an undesirable product. To avoid the issue of post-processing material shrinkage, a composite shoddy is secured to the non-carpeted surface material only when the non-carpeted surface material has cured. However, in so doing, not only is the above-described additional manufacturing steps of applying an adhesive required, but also the additional assembly steps associated with stacking the composite shoddy are usually necessary, as well as increased product handling and providing for storage of the cooling surface material. As noted above, the release liners result in increased costs, production, and handling.

As a result, there is a need in the art for a composite shoddy having an improved composition that eliminates the need for a release liner when stacked. Further, there remains a need for a composite shoddy that accommodates for post-processing material shrinkage when secured to the B-side of a "tacky" non-carpeted surface material. Still further, there remains a need for a composite shoddy suitable for in-mold bonding to the B-side of a surface material. In addition, there remains a need for a method of manufacturing a composite shoddy that reduces costs by reducing the number of steps required to manufacture same.

SUMMARY OF THE INVENTION

The present invention overcomes the disadvantages in the related art for a composite shoddy that eliminates the need for a release liner and accommodates for post-processing material shrinkage of a non-carpeted surface material and a method for manufacturing an improved composite shoddy for use in a vehicle interior. To this end, the composite shoddy of the present invention includes an organic material having a predetermined density defining an shoddy bottom layer and a scrim material having a predetermined density defining a scrim top layer. The scrim top layer is adapted to operatively engage a surface material and accommodate movement of a surface material in the shear direction. The composite shoddy further includes a mastic material having a predetermined density defining a mastic middle layer. The mastic middle layer is disposed between the shoddy bottom layer and the scrim top layer.

Accordingly, one advantage of the present invention is that it provides a composite shoddy having a non-woven scrim top layer that eliminates the need for a release liner between each composite shoddy during storage.

Another advantage of the present invention is that it provides a composite shoddy having a non-woven scrim top layer that accommodates post-processing material shrinkage of a non-carpeted surface material.

Yet another advantage of the present invention is that it provides a composite shoddy that includes sound management and vibration dampening quality for use in automotive applications.

Still another advantage of the present invention is that it provides a method of manufacturing a composite shoddy that reduces costs by reducing the number of steps necessary to manufacture and assemble a composite shoddy to a non-carpeted surface material.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 1 is an environmental view of a vehicle interior having a non-carpeted flooring surface material incorporating a composite shoddy in accordance with the present invention.

FIG. 2 is a fragmentary view of a composite shoddy of the present invention in connection with a non-carpeted surface material.

FIG. 3 is an exploded fragmentary view of a composite shoddy of the present invention shown.

DETAILED DESCRIPTION OF THE INVENTION

A composite shoddy of the present invention is generally indicated at 10 in the figures, where like numbers are used to designate like structure throughout the drawings. As shown in the figures, the composite shoddy 10 is employed within a vehicle, generally indicated at 12. Specifically, the composite shoddy 10 is shown for use in a vehicle interior, generally indicated at 14. The vehicle interior 14 is defined by a number of components such as a floor 16, seats 18 which are mounted to the floor 16, a roof (not shown), doors 22, dashboard (not shown), etc. Each of these components includes a structural element such as sheet metal 24 and/or a frame (not shown) to maintain the structural integrity of the vehicle interior 14. Generally, the structural elements for each of these components are concealed from the vehicle interior 14 by a cover such as a headliner (not shown) for the roof (not shown), door trim panel 26 for the door 22, and flooring surface material 28 for the vehicle floor 16. Thermal insulating, sound management, or cushioning substrate may be disposed between the structural elements and the cover to improve the aesthetic and other qualities of the vehicle interior 14.

The composite shoddy 10 of the present invention is shown for use in connection with the floor 16 of a vehicle 12. However, those having ordinary skill in the art will appreciate that the composite shoddy 10 of the present invention may be employed for use in other areas of a vehicle interior 14. By way of example, the composite shoddy 10 of the present invention may be employed adjacent the door trim panel 26, a molded door pillar 30, or dashboard (not shown) where commercially practical.

Referring to FIG. 2, the interior floor 16 may include sheet metal 24 and a non-carpeted surface material 32. Accordingly, the non-carpeted surface material 32 includes a "class-A side" 34 that is visible from the vehicle interior 14 and a "class-B side" 36 located opposite the A-side 34. The non-carpeted surface material 32 may be formed from any material suitable for use in connection with the intended application. By way of example, material such as polyvinylchloride (PVC) or thermoplastic polyolefin (TPO) may be employed to form the non-carpeted surface material 32.

Referring to FIGS. 2-3, the composite shoddy 10 of the present invention is disposed between the sheet metal 24 and the non-carpeted surface material 32. The composite shoddy 10 is a tri-partite construction including a bottom layer 38 adjacent the sheet metal 24, a top layer 40 adjacent the non-carpeted surface material 32, and a middle layer 42 located between the bottom layer 38 and the top layer 40. As described in greater detail below, those having ordinary skill in the art will appreciated that the bottom layer 38 is constructed from components similar to the above-referenced traditional shoddy floor substrate. Accordingly, the bottom layer 38 may also be described as the "shoddy bottom layer." The bottom layer 38 includes an engaging side 44 that operatively engages the middle layer 42, as will be described in greater detail below. The bottom layer 38 of the composite shoddy 10 is constructed from an organic material including a fibrous material. Those having ordinary skill in the art will appreciate that the fibrous material may be resinated. The fibrous material may include any organic material suitable to provide a bottom layer 38 for the composite shoddy 10 such as cotton or wool. Those having ordinary skill in the art will appreciate that the organic material may be needled to provide the organic bottom layer 38. In either event, the organic bottom layer 38 has a predetermined density and includes a predetermined thickness to provide a cushion to improve vehicle interior aesthetics and absorb any irregular contours in the sheet metal 24 from becoming visible along the A-side 34 of the non-carpeted surface material 32. The predetermined thickness of the organic bottom layer 38 is dependent upon the desired application. By way of example, where the composite shoddy 10 is employed for use in connection with a vehicle floor 16, the predetermined thickness is governed by the available substrate tolerance for a particular vehicle interior 14, considering the thicknesses of the other composite shoddy components as well as the thickness of the non-carpeted surface material 32. However, in the preferred embodiment, the predetermined thickness of the organic bottom layer 38 should not be less than three thousandths of an inch in order to avoid compromising its efficacy.

As noted above, the composite shoddy 10 of the present invention also includes a middle layer 42 that is secured to the engaging side 44 of the shoddy bottom layer 38. Specifically, the middle layer 42 includes a first surface 46 bonded to the engaging side 44 of the organic bottom layer 38 and a second surface 48 that engages the top layer 40 of the composite shoddy 10, as will be described in greater detail below. The middle layer 42 is constructed from a primarily bituminous mastic material and is therefore described as the, "mastic middle layer." The mastic middle layer 42 has a predetermined density greater than the density of the shoddy bottom layer 38 and provides vibration dampening to improve vehicle interior acoustics as well as to block exterior noise from entering the vehicle interior 14 through the shoddy bottom layer 38. The thickness of the mastic middle layer 42 is dependent upon the desired application and involves considerations similar to those described relative to the predetermined thickness of the shoddy bottom layer 38.

Those having ordinary skill in the art will appreciate that the shoddy bottom layer 38 may be secured to the first surface 46 of the mastic middle layer 42 through any conventional method. By way of example, the shoddy bottom layer 38 may be bonded to the mastic middle layer 42 by applying an adhesive to either the engaging side 44 or the first surface 46 or both. Further by way of example, the shoddy bottom layer 38 may be bonded to the mastic middle layer 42 by heating the mastic middle layer 42 such that the first surface 46 becomes tacky and subsequently placing the mastic middle layer 42 over the organic bottom layer 38. The shoddy bottom layer 38 may also be applied soon after the middle layer 42 is formed, while the mastic middle layer 42 is tacky.

As noted above, the composite shoddy 10 of the present invention also includes a top layer 40 including a contact surface 50 secured to the second surface 48 of the mastic middle layer 42. The top layer 40 further includes a receiving surface 52 opposite the contact surface 50 for engaging the class-B side 36 of a non-carpeted surface material 32. In the preferred embodiment, the top layer 40 is constructed from a non-woven scrim material having a predetermined density which may be less than that of the shoddy bottom layer 38 and the mastic middle layer 42. Further, the scrim top layer 40 includes a predetermined thickness which may be less than or equal to five millimeters (5 mm).

When composite shoddy 10 is stored in bulk in a stacking configuration, the scrim top layer 40 serves as a layer that prevents adhesion between the each composite shoddy 10. In this capacity, the scrim top layer 40 eliminates the need for a release liner to be placed between each composite shoddy 10 to accomplish the same end, thereby streamlining secondary handling of the composite shoddy 10. When the composite shoddy 10 is secured to a non-carpeted surface material 32, the scrim top layer 40 also serves as a layer that provides movement in the shear direction, which is particularly important where the composite shoddy 10 is secured to a tacky non-carpeted surface material 32. In this capacity, as the non-carpeted surface material 32 constricts as a result of post-processing material shrinkage, the scrim top layer 40 accommodates for the constriction while maintaining a bond to the non-carpeted surface material 32, thereby reducing the likelihood of undesirable wrinkling that is visible along the class-A side 34 of the non-carpeted surface material 32. To this end, the non-woven scrim top layer 40 is constructed from a material that provides movement in the shear direction while maintaining a bond to the non-carpeted surface material 32. Such material may include nylon, polyester or polyolefin fibers, such as Thinsulate® brand material from Minnesota Mining & Manufacturing Co., St. Paul, Minn. or any other material adapted to provide a similar end result.

The mastic middle layer 42 and the top layer 40 may be secured together through any conventional method, including those described above relative to securing the shoddy bottom layer 38 to the mastic middle layer 42, such as applying an adhesive or heating the mastic middle layer 42. Further, those having ordinary skill in the art will appreciate that where the conventional method of heating the mastic middle layer 42 or otherwise securing the layers while the mastic middle layer 42 is tacky, the top layer 40 and the shoddy bottom layer 38 may be secured to the mastic middle layer 42 either separately or substantially simultaneously.

As described above, the composite shoddy 10 of the present invention may be employed for use in connection with a non-carpeted surface material 32 as well as other applications within a vehicle interior 14. Where the composite shoddy 10 is employed in connection with a non-carpeted surface material 32, the composite shoddy 10 may be applied without being secured to the class-B side 36 of the non-carpeted surface material 32. However, securing the composite shoddy 10 to the non-carpeted surface material 32 is preferred to prevent movement of either substrate following installation into a vehicle 12.

The composite shoddy 10 may be secured to a non-carpeted surface material 32 through any number of conventional methods. Where the non-carpeted surface material 32 is formed at a separate location or otherwise not associated with the manufacture of the composite shoddy 10, the non-carpeted surface material 32 may be secured to the composite shoddy 10 through the application of an adhesive to either the B-side 36 of the non-carpeted surface material 32 or the non-woven scrim top layer 40 of the composite shoddy, or both. The application of adhesive to secure the composite shoddy 10 to the non-carpeted surface material 32 may also be employed while the non-carpeted surface material 32 is vacuum formed. To this end, the residual heat from vacuum forming compliments the adhesive bond between the composite shoddy 10 and the non-carpeted surface material 32 as the composite shoddy 10 is press fit into contact with the contoured B-side 36 of non-carpeted surface material 32. Another method involving the introduction of heat to facilitate securing a composite shoddy 10 to a non-carpeted surface material includes heating the non-woven scrim top layer 40 until it becomes tacky and subsequently placing the non-carpeted surface material 32 onto the tacky scrim top layer 40. However, this method of bonding the two substrates may be employed where the application of heat will not compromise the non-woven scrim top layer's ability to provide movement in the shear direction.

The composite shoddy 10 may be secured to a non-carpeted surface material 32 through any number of conventional methods. Where the non-carpeted surface material 32 is formed at a separate location or otherwise not associated with the manufacture of the composite shoddy 10, the non-carpeted surface material 32 may be secured to the composite shoddy 10 through the application of an adhesive to either the class-B side 36 of the non-carpeted surface material 32 or the non-woven scrim top layer 40 of the composite shoddy, or both. The application of adhesive to secure the composite shoddy 10 to the non-carpeted surface material 32 may also be employed while the non-carpeted surface material 32 is vacuum formed. To this end, the residual heat from vacuum forming compliments the adhesive bond between the composite shoddy 10 and the non-carpeted surface material 32 as the composite shoddy 10 is press fit into contact with the contoured class-B side 36 of non-carpeted surface material 32. Another method involving the introduction of heat to facilitate securing a composite shoddy 10 to a non-carpeted surface material includes heating the non-woven scrim top layer 40 until it becomes tacky and subsequently placing the non-carpeted surface material 32 onto the tacky scrim top layer 40. However, this method of bonding the two substrates may be employed where the application of heat will not compromise the non-woven scrim top layer's ability to provide movement in the shear direction. Alternatively, the composite shoddy 10 may be bonded to the non-carpeted surface material 32 while at least the class-B side 36 of the non-carpeted surface material 32 is tacky, such is the case following the manufacture of non-carpeted surface material 32 via spraying a liquefied polymer into a mold. As the liquefied polymer cools/cures to form the non-carpeted surface material 32, the composite shoddy may be applied to the class-B side 36. The tacky quality of the cooling/curing non-carpeted surface material bonds to the composite shoddy, thereby eliminating the need for an adhesive. However, those having ordinary skill in the art will appreciate that an adhesive may still be employed.

Those having ordinary skill in the art will further appreciate that several other methods that may be employed to bond the composite shoddy 10 to a non-carpeted surface material 32. By way of example, the non-carpeted surface material 32 may be formed directly on top of the composite shoddy 10, where the composite shoddy 10 is be placed into a die and the non-carpeted surface material 32 is extruded thereon. Once extruded onto the composite shoddy 10, the non-carpeted surface material 32 is left to at least partially cool to form and bond to the composite shoddy 10. This method of manufacture may also be employed to bond the layers of the composite shoddy 10 together while forming the non-carpeted surface material 32. Accordingly, the shoddy bottom layer 38, mastic middle layer 42, and scrim top layer 40 may be placed in a die in a manner such that the mastic middle layer 42 is disposed between the shoddy bottom layer 38 and the scrim top layer 40. In this way, the scrim top layer 40 is disposed in contact with the extruded thermoplastic material. The residual heat from the extruding process will also bond the shoddy bottom layer 38 and the scrim top layer 40 to the mastic middle layer 42. As the non-carpeted surface material 32 cools, it will bond to the composite shoddy 10 in-situ.

The present invention provides a composite shoddy 10 for use in automotive applications having a non-woven scrim top layer 40. Accordingly, the present invention eliminates the need for a release liner between each composite shoddy 10 during storage. Further, the non-woven scrim top layer 40 of the present invention accommodates for post-processing material shrinkage of a non-carpeted surface material 32 to reduce wrinkling on the class-A side 34, thereby improving the class-A side 34 appearance of a non-carpeted surface material 32. Still further, the present invention provides a composite shoddy 10 for use in automotive applications having a mastic middle layer 42. Accordingly, the present invention provides a sound management and vibration dampening quality to improve the acoustics of a vehicle interior 14. Still further, the present invention provides a method of manufacturing a composite shoddy 10 that reduces the steps the number of steps necessary to manufacture and assemble a composite shoddy 10 to a non-carpeted surface material 32, thereby reducing manufacture and assembly costs.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A method of manufacturing a composite shoddy for use as underlayment for a surface material in automotive applications comprising the steps of:
   providing an organic base material defining a shoddy bottom layer having an engaging surface;
   providing a primarily bituminous mastic material defining a mastic middle layer having a first surface and a second surface opposite said first surface;
   bonding said engaging surface of said shoddy bottom layer to said first surface of said mastic middle layer;
   providing a scrim material defining a scrim top layer having a mastic contact surface and a receiving surface opposite said mastic contact surface; and
   bonding said second surface of said mastic middle layer to said mastic contact surface of said scrim top layer to form a tri-partite composite shoddy having a mastic middle layer disposed between a shoddy bottom layer and a scrim top layer for use in automotive applications, wherein said receiving surface of said scrim top layer is adapted to operatively engage a class-B side of a non-carpeted surface material.

2. The method of manufacturing a composite shoddy as set forth in claim 1 wherein the step of providing a mastic material further includes any of the following steps:
   providing said mastic middle layer where said mastic middle layer is tacky;
   providing said mastic middle layer where said mastic middle layer is tack-free.

3. The method of manufacturing a composite shoddy as set forth in claim 2 wherein the step of bonding said engaging surface of said shoddy bottom layer to said first surface of said mastic middle layer further includes one or more of the following steps:
   applying an adhesive to said engaging surface of said shoddy bottom layer;
   applying an adhesive to said first surface of said mastic middle layer;
   heating said mastic middle layer to bond said first surface to said engaging surface of said shoddy bottom layer;
   placing said first surface of said mastic middle layer into contact with said engaging surface of said shoddy bottom layer where said mastic middle layer is tacky.

4. The method of manufacturing a composite shoddy as set forth in claim 2 wherein the step of bonding said second surface of said mastic middle layer to said mastic contact surface of said scrim top layer further includes one or more or the following steps:
   applying an adhesive to said second surface of said mastic middle layer;
   applying an adhesive to said mastic contact surface of said scrim top layer;
   heating said mastic middle layer to bond said mastic contact surface of said scrim top layer or;

placing said second surface of said mastic middle layer into contact with said mastic contact surface of said scrim top layer where said mastic middle layer is tacky.

5. The method of manufacturing a composite shoddy as set forth in claim 1 further comprises the step of operatively engaging said receiving surface of said scrim top layer to a non-carpeted surface material for use in automotive applications, the non-carpeted surface material having a substantially planar cross-section including a class-A side that is visible from the interior of a vehicle and a class-B side opposite the class-A side.

6. The method of manufacturing a composite shoddy as set forth in claim 1 wherein the step of operatively engaging said receiving surface of said scrim top layer to a non-carpeted surface material for use in an automotive applications further includes one or more of the following steps:

placing said receiving surface of said scrim top layer in contact with the class-B side of a non-carpeted surface material between 2 and 125 seconds after forming the non-carpeted surface material;

applying an adhesive to said receiving surface of said scrim top layer;

applying an adhesive to the class-B side of a non-carpeted surface material;

heating the class-B side of a non-carpeted surface material to bond said receiving surface to the class-B side of a non-carpeted surface material.

* * * * *